Figure 1:
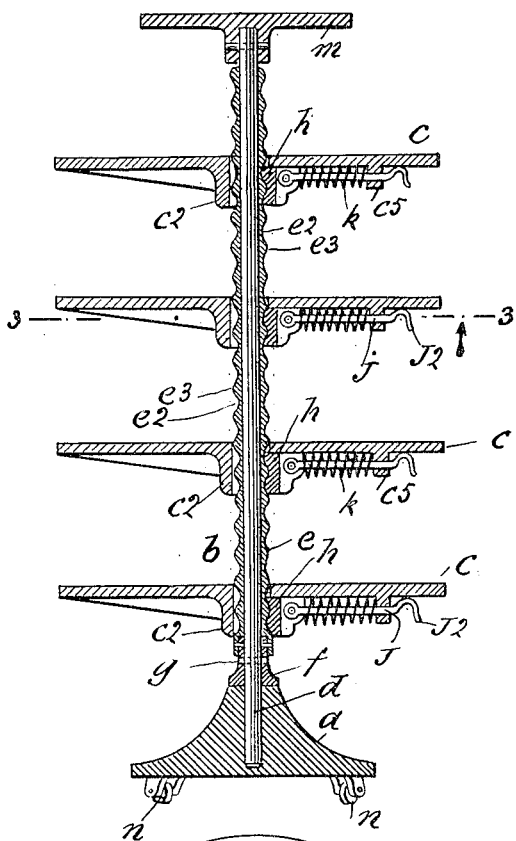

No. 844,754. PATENTED FEB. 19, 1907.
G. P. SARDOU & G. STADTLANDER.
DISPLAY STAND.
APPLICATION FILED JULY 9, 1906.

WITNESSES
Ernest Hagen
F. A. Stewart

INVENTORS
George P. Sardou,
BY George Stadtlander.
Edgar Tate & Co.
ATTORNEYS

UNITED STATES PATENT OFFICE.

GEORGE P. SARDOU AND GEORGE STADTLANDER, OF NEW YORK, N. Y.

DISPLAY-STAND.

No. 844,754.  Specification of Letters Patent.  Patented Feb. 19, 1907.

Application filed July 9, 1906. Serial No. 325,204.

*To all whom it may concern:*

Be it known that we, GEORGE P. SARDOU and GEORGE STADTLANDER, citizens of the United States, and residing at New York, in the county of New York and State of New York, have invented certain new and useful Improvements in Display-Stands, of which the following is a specification, such as will enable those skilled in the art to which it appertains to make and use the same.

This invention relates to display-stands; and the object thereof is to provide an improved device of this class particularly designed for use by grocers for the display of canned and bottled goods, but which may be used for various other purposes, a further object being to provide a display-stand by means of which various kinds and classes of merchandise articles may be conveniently displayed and easily got at when wanted.

The invention is fully disclosed in the following specification, of which the accompanying drawings form a part, in which the separate parts of our improvement are designated by suitable reference characters in each of the views, and in which—

Figure 2:
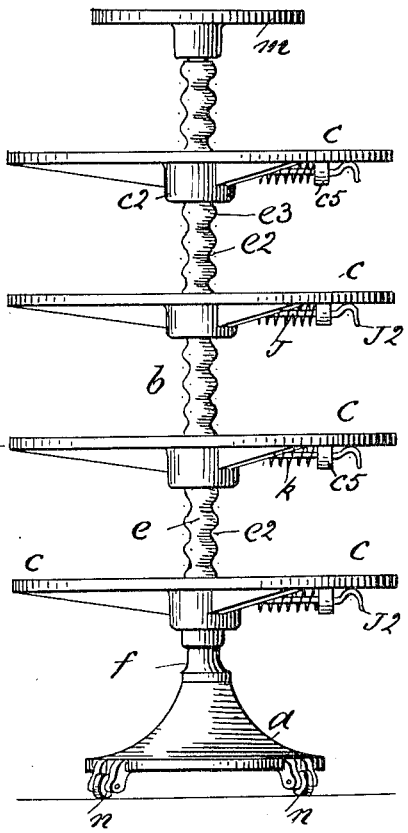
Figure 3:
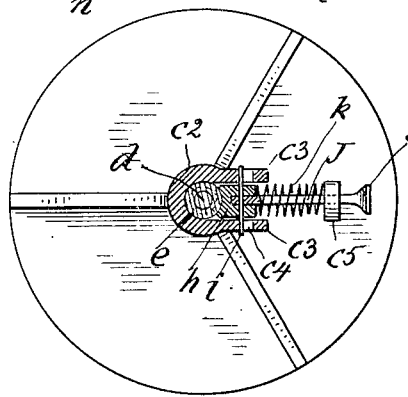

Figure 1 is a central vertical sectional view of our improved display-stand; Fig. 2, a side view thereof, and Fig. 3 a section on the line 3 3 of Fig. 1.

Our improved display-stand comprises a base $a$, having an upright standard or support $b$, on which are mounted shelves $c$, the construction being such that the shelves $c$ are independently rotatable on the upright standard or support, whereby either of said shelves may, if desired, be turned so as to display to view any articles placed thereon, and the construction is also such that all of said shelves may be turned at the same time for the same purpose.

The standard or support $b$ in the construction shown comprises a central vertical shaft $d$, rotatably mounted in the base $a$, and an inclosing tubular casing $e$, mounted on said shaft, and said rotatable tubular casing $e$ is provided in the form of construction shown with annular grooves $e^2$, forming corresponding annular beads $e^3$, whereby said tubular casing $e$ is made to serve as a rackbar on which the shelves $c$ are vertically movable.

The tubular casing $e$ is connected at the bottom thereof with a collar $f$, which rests on the base $a$ and through which the shaft $d$ passes, and in the form of construction shown the said tubular casing $e$ is rigidly connected with said collar, and said collar is rigidly connected with said shaft by means of a pin $g$.

Each of the shelves $c$ is provided on the bottom thereof with a central hub $c^2$, provided at one side with parallel jaws $c^3$, and mounted between the jaws $c^3$ is a radially-movable block $h$, through which is passed a pin $i$, movable in horizontal slots $c^4$ in the jaws $c^3$, and connected with the block $h$, by means of the pin $i$, is a radially-arranged rod $j$, which passes outwardly through a lug $c^5$, connected with the bottom of the shelves $c$, and wound on the rod $j$, between the lug $c^5$ and the block $h$, is a spring $k$, which normally serves to force the block $h$ inwardly, and the inner face of said block is corrugated transversely to correspond with the corrugations on the tubular casing $e$, and the outer end of the rod $j$ is provided with a downwardly-directed finger $j^2$, and by grasping the shelves $c$ at the edge thereof and pulling outwardly on the finger $j^2$ of the rod $j$ the block $h$ will be withdrawn from contact with the tubular casing $e$ and the shelf may be raised or lowered on said tubular casing or on the upright standard or support $b$, and when the pull on the finger $j^2$ is released the block $h$ will be forced back into contact with the tubular casing $e$ of the upright standard or support, and in this way, as will be understood, the shelves $c$ may be vertically adjusted on the upright standard or support $b$, and each of said shelves may be independently rotated on said standard or support whenever desired. The upper end of the shaft $d$ is also provided in the form of construction shown with a shelf $m$, which is rigidly secured thereto, and by means of said shelf the upright standard or support, including the shaft $d$ and tubular casing $e$ and all the shelves mounted on said standard or support, may be turned at the same time. The base $a$ is also preferably provided with casters or rollers $n$, by means of which the display device may be conveniently moved from one point to another, and it will be understood that the said base may be of any desired form or construction.

Having fully described our invention, what we claim as new, and desire to secure by Letters Patent, is—

1. A display device or rack comprising a base having a vertically-arranged standard or support comprising a central shaft rotatably mounted in said base and a tubular casing mounted on said shaft, said tubular casing being provided with annular grooves and ribs, a plurality of shelves mounted on said tubular casing and provided with spring-operated blocks adapted to engage said casing, and means for withdrawing said blocks from engagement with said casing, said shelves being vertically adjustable and independently rotatable on said casing.

2. A display device or rack comprising a base having a vertically-arranged standard or support comprising a central shaft rotatably mounted in said base and a tubular casing mounted on said shaft, said tubular casing being provided with annular grooves and ribs, a plurality of shelves mounted on said tubular casing and provided with spring-operated blocks adapted to engage said casing, and means for withdrawing said blocks from engagement with said casing, said shelves being vertically adjustable and independently rotatable on said casing, and said shaft being provided at its upper end with a shelf rigidly secured thereto.

3. A display-rack, comprising a base having an upright standard rotatably mounted therein, a tubular sleeve through which said standard passes, and a plurality of shelves mounted on said tubular sleeve and rotatable thereon, and vertically adjustable thereon, whereby said shelves are made independently rotatable and independently adjustable, and whereby all of said shelves may be turned at the same time.

4. A display-rack, comprising a base having a vertically-arranged rotatable shaft mounted therein, a tubular sleeve mounted on said shaft and provided with annular grooves, a plurality of shelves mounted on said tubular sleeve and rotatable thereon, each of said shelves being provided with a spring-operated locking device adapted to operate in connection with said grooves, and each of said shelves being vertically adjustable on said sleeve.

In testimony that we claim the foregoing as our invention we have signed our names, in presence of the subscribing witnesses, this 5th day of July, 1906.

GEORGE P. SARDOU.
GEORGE STADTLANDER.

Witnesses:
F. A. STEWART,
C. J. KLEIN.